3,249,572
WATER SOLUBLE PRESSURE SENSITIVE ADHESIVES

Irwin J. Davis, Plainfield, and Julius Sirota, South Plainfield, N.J., assignors to National Starch and Chemical Corporation, New York, N.Y., a corporation of Delaware
No Drawing. Filed Dec. 24, 1963, Ser. No. 333,214
4 Claims. (Cl. 260—29.6)

This invention relates to a method for improving the properties of a class of water soluble, pressure sensitive adhesives as well as to the improved adhesives thus prepared.

As is known in the art, pressure sensitive adhesives comprise a class of adhesive compositions which may be formulated from a variety of materials such as gums and resins of both natural and synthetic derivation. When coated on a suitable substrate, these adhesives share the common characteristic of being aggressively and permanently tacky at room temperature and are then able to adhere to surfaces by the application of nothing more than manual pressure. Adhesives of this type may be applied to various substrates such as paper, cloth, and plastic films and the resulting coated substrates may then be converted to tapes and labels which are especially useful in the packaging field for any number of applications involving marking, sealing, reinforcing or binding.

In the past, pressure sensitive adhesives have always been based upon organic solvent soluble adhesive bases which could not be dissolved in aqueous media. United States Patent 2,985,609, Plitt, May 23, 1961, discloses water soluble pressure sensitive adhesives. In the latter patent, however, there are described compositions comprising mixtures of polyvinyl alcohol and polyethyleneimine which, for the first time, permitted the preparation of pressure sensitive adhesives that were soluble in water. As noted in the patent, these novel compositions offer the practitioner the advantage of being quickly and easily removed from a substrate merely by washing with water, thereby avoiding the use of costly organic solvents which are often injurious to the user as well as to the substrates to which they are applied. The use of organic solvents is, of course, required for the clean up and removal of the solvent soluble pressure sensitive adhesives of the prior art.

Although Plitt's novel compositions are seen to provide a long desired improvement over solvent soluble pressure sensitive adhesives, they are nonetheless deficient in certain respects and these deficiencies have, in turn, served to preclude or limit their more widespread acceptance and utilization. Thus, for example, Plitt's adhesives are characterized by their rather poor heat stability, particularly upon aging at elevated temperatures. This poor heat stability results in a gradual loss of tack, or stickiness, on the part of the films and coatings which are derived from these compositions, thereby curtailing their efficiency as is indicated by a sharp reduction in the tensile strength of the bonds which are obtained therewith. It is interesting to note that the latter phenomenon is accompanied by the insolubilization of the polyethyleneimine component of these adhesives, thus demonstrating that their poor heat stability is apparently related to the ease with which polyethyleneimine is crosslinked. Moreover, the poor heat stability of these polyvinyl alcohol-polyethyleneimine mixtures also manifests itself in a rapid discoloration of the adhesive films derived therefrom as well as of the paper or other substrate to which it had been applied.

In addition to the above described disadvantages, Plitt's adhesives display rather poor cohesive characteristics which are indicated by the rapid rate at which the films and coatings derived from these compositions tend to become hardened to the point of embrittlement particularly upon aging at elevated temperatures. Finally, it may be noted that these adhesives actually possess too high a degree of solubility in water to permit their proper utilization in certain applications.

It is thus the object of this invention to enhance the properties of water soluble polyvinyl alcohol-polyethyleneimine pressure sensitive adhesive compositions so as to be able to reduce, or entirely eliminate, their inherently poor heat stability thus preventing loss of tack and discoloration, while also improving upon their cohesive characteristics and reducing their excessive degree of water solubility. Various other objects and advantages of this invention will be apparent upon a reading of the detailed description which follows hereinafter.

We have discovered that all of the above objects are readily achieved by means of the process of our invention which contemplates the addition of acids to the polyvinyl alcohol-polyethyleneimine adhesive compositions. Thus, we have found, surprisingly, that all types of both inorganic and organic acids are capable of effecting these desired improvements in the latter adhesives. Applicable acids may therefore be selected from the classes of acids consisting of: inorganic, i.e., mineral, acids such as hydrochloric, phosphoric and sulfuric acids; aliphatic polycarboxylic acids such as citric, tartaric, oxalic and succinic acids; aliphatic monocarboxylic acids such as acetic, propionic and butyric acids; and, aromatic acids such as benzoic, phthalic, para-toluene sulfonic, and alpha-naphthoic acids. It is to be noted in the above list of acids that with respect to the group of acids consisting of sulfuric acid, the various monobasic mineral acids, the aliphatic monocarboxylic acids, and the aromatic monocarboxylic acids, the minimum ionization constant (i.e., K, or $K_1$ in the case of sulfuric acid which has both a primary and secondary ionization constant) for any of the acids within the latter group is at least about $1.34 \times 10^{-5}$. Henceforth, the symbol "K" will, for purposes of brevity, be used in both the specification and claims to denote the primary ionization constant ($K_1$) for sulfuric and as well as the sole ionization constant (K) for all the monobasic mineral acids, aliphatic monocarboxylic acids and aromatic monocarboxylic acids applicable for use in the subject invention. However, for optimum results in the process of this invention, it is desirable to employ poly-basic acids, i.e., those acids having more than one available hydrogen ion, which have an ionization constant ($K_1$) in the range of from about $6.25 \times 10^{-2}$ to $9.75 \times 10^{-4}$ as, for example, phosphoric, tartaric, citric, oxalic, fumaric, and malonic acids.

In any event, the addition of an acid to polyvinyl alcohol-polyethyleneimine water soluble, pressure sensitive adhesive compositions yields a remarkable improvement in their heat stability, particularly upon aging at elevated temperatures. This improvement is thought to result from an inhibition, by the acid, of the natural tendency on the part of polyethyleneimine to crosslink with itself. As a consequence thereof, the films and coatings derived from these compositions are no longer prone to a gradual loss of tack on aging so that there is no appreciable loss in the tensile strength of their adhesive bonds. Moreover, this improvement in the heat stability of these adhesives also minimizes their discoloration as well as any discoloration of the substrates to which they have been applied. In addition, the process of this invention provides for substantial improvements in the cohesive characteristics of these polyvinyl alcohol-polyethyleneimine adhesives as indicated by the fact that although there is a moderate amount of hardening on the part of their films and coatings, they never become hardened and embrittled to the point where they are no longer capable of utilization.

Also of importance in the improved adhesive compositions of our invention is the fact that the normally high degree of water solubility displayed by the unimproved, i.e. the acid free, formulations is now reduced to a range where, although they are still water soluble, they are no longer excessively soluble to a degree where they cannot be utilized for certain applications. Thus, whereas the Plitt patent notes that an advantage of these water soluble polyvinyl alcohol-polyethyleneimine adhesives is the ease with which their residues may be removed by being washed away with water, it does not mention that these adhesives are also applicable for use in various applications wherein organic solvent soluble pressure sensitive adhesives are totally inoperable.

Such applications which are limited to these unique water soluble adhesives, and in which we have found our improved compositions to be eminently suitable, include their use in adhering labels and tapes to wet surfaces such, for example, as the surfaces of fruits and vegetables which have previously been washed and are still damp. Similarly, these adhesives may be used for the adhesion of tapes and labels to the surfaces of articles which have been refrigerated and then quickly exposed to a warm, humid atmosphere which causes moisture to condense thereon. It can be readily appreciated that the use in any of the latter applications of an adhesive with too high a degree of water solubility would not, of course, be possible. Our improved compositions, however, have the proper degree of water solubility which permits their use on wet surfaces without any danger of their being disintegrated. Needless to say, the improved adhesives resulting from the process of this invention may also be utilized for the adhesion of tapes and labels to dry substrates.

Polyethyleneimine is prepared by the polymerization of ethyleneimine. In the resulting polymer, the mers, i.e. the repetitive chemical structural units correspond to the formula $\text{-(CH}_2\text{—CH}_2\text{—NH)-}$. For most adhesive applications, it is desirable to employ polymers having a substantially high molecular weight, since, as is the case with all polymeric materials, such properties as internal strength and film forming ability are directly related to this factor. Thus, for use in preparing our novel adhesive compositions, it is suggested that one utilize polyethyleneimine having a degree of polymerization, hereinafter referred to as "D.P.," of at least about 300. The D.P. of a polymer represents the number of mers in the polymer molecule so that the relationship between the D.P. and the molecular weight of a polymer is simply that its molecular weight is the product of its mer weight and its D.P.

As for the polyvinyl alcohol which is applicable for use in our adhesives, one may employ any desired type of polyvinyl alcohol provided that it is water soluble.

The actual preparation of our improved adhesives may be readily accomplished by first dissolving the polyvinyl alcohol in water whereupon the polyethyleneimine is introduced. It may be noted that polyethyleneimine is ordinarily supplied in the form of an aqueous solution which need merely be added to the aqueous polyvinyl alcohol soluiton. The selected acid is then admixed with the polyvinyl alcohol-polyethyleneimine solution, preferably by being introduced in the form of an aqueous solution. Any suitable variation of the latter sequence of operations may be utilized in the preparation of these adhesive compositions where so desired by the practioner.

With respect to proportions, these compositions may contain from about 25.0 to 5.0 parts of polyethyleneimine per part, by weight, of polyvinyl alcohol with optimum results being obtained by the use of about 12 parts of polyethyleneimine per part, by weight, of polyvinyl alcohol. It may be noted that as the concentration of polyethyleneimine is increased above 12 parts per part, by weight, of polyvinyl alcohol, the resulting formulation yields films and coatings which become progressively softer. On the other hand, by decreasing the polyethyleneimine concentration below 12 parts per part, by weight, of polyvinyl alcohol, the resulting films and coatings become progressively harder. As for the concentration of acid which may be used, we have found that at least about 3.5% of acid, as based upon the weight of polyethyleneimine present in the formulation, is necessary in order to obtain the desired improvements inherent in the process of our invention. As for the maximum concentration, we have found that the use of any more than about 30% of acid, as based upon the weight of polyethyleneimine is not ordinarily desirable as it will result in extremely hard adhesive films which display a low degree of tensile strength and poor cohesive characteristics. It should be understood that the latter information relating to the concentration of acid which can be used in our formulations is provided merely as a guide to the practitioner. Needless to say, these ranges may be subject to some variation in view of the many different types of acids which can be utilized in conducting the process of our invention.

As noted earlier, we have expressed a preference for the use, in the process of our invention, of polybasic acids having an ionization constant $(K_1)$ in the range of from about $6.25 \times 10^{-2}$ to $9.75 \times 10^{-4}$. In comparison with the use of acids having the latter specifications, we have found that the use of monobasic acids or of stronger acids, i.e. those acids having a higher ionization constant, results in the preparation of adhesive masses which, although they are an improvement over the acid-free mixtures and are generally acceptable for most applications, nonetheless display somewhat poorer aging characteristics at elevated temperatures, are less tacky, display a slight yellowing on aging, and have an unusual affinity for the silicone treated release papers which are often applied to substrates coated with pressure sensitive adhesives in order to prevent their sticking together and accumulating dirt during their storage and handling. With regard to the use of weaker acids, i.e. those acids having a lower ionization constant, it should be noted that it is necessary that they be utilized in rather undesirably large concentrations in order to be able to obtain the desired improvements which are sought in the adhesive compositions of our invention.

If desired, one may introduce various types of additives into our improved adhesive compositions including, for example, humectants such as glycerine, diethylene glycol, and propylene glycol, etc. which may be present in a concentration of about 0.02 to 0.04 part per part, by weight, of polyethyleneimine. Aliphatic alcohols such, for example, as isopropanol and ethanol may also be introduced into our compositions as a means of alleviating the tendency towards curling which is often displayed by various substrates, such as paper, upon their being coated with aqueous adhesive compositions and subsequently dried at elevated temperatures. Such alcohols may be introduced in a concentration of about 0.5 to 1.0 part per part, by weight, of polyethyleneimine which is present in the formulation. Other additives which may be introduced into our formulations include various water soluble plasticizers. The total solids content of these aqueous compositions of our invention should ordinarily be in the range of about 20.0 to 40.0%, by weight.

Subsequent to their preparation, our novel adhesive formulations may be coated, by any convenient means, onto the surface of a suitable substrate such, for example, as paper, paperboard, cloth, metal sheets and foils, fiber glass, foamed plastics, rubber, cellophane, wood, and plastic films and sheets such as those derived from polyethylene, polypropylene, polyvinyl chloride, polyethylene glycol terephthalate, polystyrene, and polyvinylidene chloride. The resulting adhesive coated substrates should then be dried by any available means. Following the drying operation, the coated substrate is then ordinarily subjected to a conditioning period whereby it is maintained at room temperature for about 24 hours in order to allow for the absorption, by the coating, of atmospheric humidity which serves to develop its necessary degree of tack. Such conditioning is particularly desirable where the coating has been dried at elevated temperatures. It may be further mentioned that this conditioning operation may be conducted either before or after the coated substrate has been converted into tapes, labels or any other form desired by the practitioner. As noted earlier, silicone or other suitably treated release papers may be applied to the adhesive coated surface of these products in order to facilitate their subsequent handling and storage. In addition, the improved adhesives of this invention may also be used for the direct bonding or lamination of any of the above listed substrates.

The following examples will further illustrate the embodiment of this invention. In these examples, all parts given are by weight unless otherwise noted. Moreover, the polyethyleneimine utilized in the various formulations described in these examples had a D.P. of about 800.

*Example 1.*—This example illustrates the preparation of a number of formulations representative of the improved adhesive compositions of our invention and also demonstrates their superior properties in comparison with the properties of identical formulations which did not, however, contain an acid.

The following adhesive formulations were prepared by first dissolving the polyvinyl alcohol in water, which, in the case of Formulations 2 and 2A, also contained isopropanol. The polyethyleneimine, in a 50% by weight aqueous solution, was then admixed with the latter polyvinyl alcohol solution whereupon there was then added thereto an aqueous solution of the selected acid. Formulations 1A and 2A represent controls for Formulations 1 and 2, respectively. These controls were identical in composition to Formulations 1 and 2 with the exception that they did not contain an acid.

Formulation 1: Parts
 Polyvinyl alcohol _____ 1.1
 Polyethyleneimine _____ 13.7
 Water _____ 27.5*
 Citric acid _____ 2.0

Formulation 1A: Parts
 Polyvinyl alcohol _____ 1.1
 Polyethyleneimine _____ 13.7
 Water _____ 21.5

Formulation 2: Parts
 Polyvinyl alcohol _____ 1.14
 Polyethyleneimine _____ 13.65
 Isopropanol _____ 6.82
 Phosphoric acid _____ 2.0
 Water _____ 34.5*

Formulation 2A: Parts
 Polyvinyl alcohol _____ 1.14
 Polyethyleneimine _____ 13.65
 Isopropanol _____ 6.82
 Water _____ 28.5

*An additional 6 parts of water was used to dissolve the acid prior to its addition to the aqueous solution of polyvinyl alcohol and polyethylene.

Each of the above described formulations were then coated, respectively, upon films of 3 mil thick polyethylene glycol terephthalate. The wet coatings had a thickness of 4 mils. After drying for 5 minutes in an oven set at 200° F., the dry coatings had a thickness of about 1 mil (one mil=0.001 inch). The dried coatings were then conditioned for 24 hours at room temperature prior to their being subjected to the various tests described below.

Freshly prepared samples of each of the thus coated films were then evaluated in order to determine the tensile strength of the adhesive bonds which they were capable of achieving. In this procedure, a 1″ x 6″ strip was cut from the coated film so that its long dimension was parallel to the direction in which the adhesive coating was originally cast. About 3 inches along one end of this strip were then firmly adhered to a stainless steel plate while the free end of the strip was affixed to the jaws of an Instron Tensile Tester, as sold by the Instron Engineering Corp. of Quincy, Mass. At a withdrawal rate of 12″ per minute, the adhesive coated strip was then peeled from the steel plate at an angle of 180° while the apparatus recorded the maximum tensile strength, in ounces per inch width, which had been developed by the adhesive bond between the film strip and the steel plate. This tensile strength determination was then repeated using samples obtained from similarly coated polyethylene glycol terephthalate films which, in this case, had been aged, respectively, for 3 and for 6 days at a temperature of 140° F.

Additional freshly prepared samples of each of the adhesive coated polyethylene glycol terephthalate films were also evaluated in order to determine their cohesive characteristics. In this procedure, a 1″ x 3″ strip was cut from each sample and a ½″ length at the end of the strip was then firmly adhered to a chromium plated steel bar. A 500 gram weight was thereupon securely attached to the free end of the film strip and the time required for the weighted strip to be pulled free from the chromium plated steel bar was then recorded. This evaluation of cohesive characteristics was then repeated using samples obtained from similarly coated polyethylene glycol terephthalate films which, in this case, had been aged, respectively for 3 and for 6 days at a temperature of 140° F.

The results of both the tensile strength and cohesive characteristic evaluations are presented in the following table. The presence of any color formation in the samples which had been aged for 3 days at 140° F. is also indicated.

TENSILE STRENGTH

[Ounces per inch width]

| Formulation | Initial | 3 days at 140° F. | 6 days at 140° F. |
|---|---|---|---|
| 1 [1] | 80.0 | 88.0 | 72.0 |
| 1A [2] | 64.0 | 24.0 | 8.0 |
| 2 [1] | 134.4 | 115.0 | 104.0 |
| 2A [2] | 104.0 | 32.0 | 19.2 |

COHESIVE CHARACTERISTICS

[Time for strip to fall (hours:min.:sec.)]

| Formulation | Initial | 3 days at 140° F. | 6 days at 140° F. |
|---|---|---|---|
| 1 [1] | 0:07:10 | 0:29:20 | 0:13:45 |
| 1A [2] | 0:02:55 | 10:16:20 | 9:56:05 |
| 2 [1] | 0:52:55 | 1:05:01 | 1:16:15 |
| 2A [2] | 0:06:40 | 1:30:15 | 2:54:20 |

[1] Adhesive coating did not turn yellow after aging for 3 days at 140° F.
[2] Adhesive coating turned yellow after aging for 3 days at 140° F.

The tensile strength data in the above table clearly indicates that the addition of acids of polyvinyl alcohol-polyethyleneimine adhesive compositions not only increases the initial tensile strength of their adhesive bonds but also prevents any significant decrease in the tensile strength of their adhesive bonds after aging at elevated temperatures. The resistance to discoloration of these improved formulations is also readily evident.

The above data relating to the evaluation of the cohesive characteristics of our improved acid containing polyvinyl alcohol-polyethyleneimine formulations indicates that, in contrast to the behavior of the acid free formulations, the adhesive films derived from our novel compositions were prevented from becoming excessively hard and embrittled upon being aged at elevated temperatures. This fact is demonstrated by noting that in the case of our improved formulations, there was no sharp increase, with againg at elevated temperatures, in the time required for the weighted film strip to be pulled free from the chromium plated steel bar. Thus, on aging at elevated temperatures, our adhesive films increase in hardness to only a moderate degree whereas the extreme rise in the time required for the acid free adhesive films to be pulled free indicates that they have become embrittled to a degree which renders them useless.

*Example II.*—This example illustrates additional formulations representative of the improved adhesive compositions of this invention.

Each of the following formulations were prepared by means of the procedure described in Example I, hereinabove.

Formulation 1: Parts
- Polyvinyl alcohol _____ 1.1
- Polyethyleneimine _____ 13.7
- Water _____ 23.0
- Sulfuric acid _____ 0.5

Formulation 2: Parts
- Polyvinyl alcohol _____ 1.1
- Polyethyleneimine _____ 13.7
- Water _____ 27.5
- Benzoic acid _____ 2.0

Formulation 3: Parts
- Polyvinyl alcohol _____ 1.1
- Polyethyleneimine _____ 13.7
- Water _____ 23.0
- Phthalic acid _____ 0.5

Formulation 4: Parts
- Polyvinyl alcohol _____ 1.1
- Polyethyleneimine _____ 13.7
- Water _____ 27.5
- Hydrochloric acid _____ 2.0

Formulation 5: Parts
- Polyvinyl alcohol _____ 1.1
- Polyethyleneimine _____ 13.7
- Water _____ 23.0
- Isopropanol _____ 13.7
- p-Toluene sulfonic acid _____ 0.5

Formulation 6: Parts
- Polyvinyl alcohol _____ 1.1
- Polyethyleneimine _____ 13.7
- Water _____ 27.5
- Isopropanol _____ 13.7
- Alpha-naphthoic acid _____ 2.0

Formulation 7: Parts
- Polyvinyl alcohol _____ 1.1
- Polyethyleneimine _____ 13.7
- Isopropanol _____ 13.7
- Water _____ 27.5
- Phosphoric acid _____ 2.0

Formulation 8: Parts
- Polyvinyl alcohol _____ 1.1
- Polyethyleneimine _____ 13.7
- Isopropanol _____ 13.7
- Water _____ 24.5
- Acetic acid _____ 1.0

Formulation 9: Parts
- Polyvinyl alcohol _____ 1.1
- Polyethyleneimine _____ 13.7
- Water _____ 27.5
- Oxalic acid _____ 2.0

Formulation 10: Parts
- Polyvinyl alcohol _____ 1.1
- Polyethyleneimine _____ 13.7
- Water _____ 33.5
- Phosphoric acid _____ 4.0

Formulation 11: Parts
- Polyvinyl alcohol _____ 1.1
- Polyethyleneimine _____ 13.7
- Isopropanol _____ 13.7
- Water _____ 24.5
- Tartaric acid _____ 1.0

Formulation 12: Parts
- Polyvinyl alcohol _____ 1.1
- Polyethyleneimine _____ 13.7
- Isopropanol _____ 13.7
- Water _____ 27.5
- Propionic acid _____ 2.0

Formulation 13: Parts
- Polyvinyl alcohol _____ 1.1
- Polyethyleneimine _____ 13.7
- Isopropanol _____ 13.7
- Water _____ 33.5
- Malonic acid _____ 4.0

Formulation 14: Parts
- Polyvinyl alcohol _____ 0.73
- Polyethyleneimine _____ 17.65
- Water _____ 30.2
- Lactic acid _____ 2.50

Formulation 15: Parts
- Polyvinyl alcohol _____ 0.73
- Polyethyleneimine _____ 17.65
- Water _____ 30.2
- Phosphoric acid _____ 2.50

Formulation 16: Parts
- Polyvinyl alcohol _____ 1.56
- Polyethyleneimine _____ 9.40
- Water _____ 24.58
- Fumaric acid _____ 1.50

Formulation 17: Parts
- Polyvinyl alcohol _____ 1.56
- Polyethyleneimine _____ 9.40
- Water _____ 24.58
- Citric acid _____ 1.50

Formulation 18: Parts
- Polyvinyl alcohol _____ 1.14
- Polyethyleneimine _____ 13.65
- Water _____ 34.5
- Nitric acid _____ 2.0

The adhesive films derived from each of the above described formulations displayed improved heat stability as was evidenced by their high tensile strength and freedom from discoloration upon aging at elevated temperatures. They also demonstrated improved cohesive characteristics. Labels coated with these adhesives were readily adhered to the damp surfaces of fruits and vegetables as well as to all types of dry substrates.

The process of this invention is thus seen to provide the practitioner with a means for improving upon the properties of water soluble, pressure sensitive polyvinyl alcohol-polyethyleneimine adhesive compositions. Variations may be made in procedures, proportions, and materials without departing from the scope of this invention which is limited only by the following claims.

What is claimed is:

1. A pressure sensitive adehsive composition displaying improved heat stability, said composition comprising a mixture, in aqueous solution, of polyvinyl alcohol, from about 25.0 to 5.0 parts of polyethyleneimine per part by weight of said polyvinyl alcohol, and an acid selected from a group consisting of (1) monobasic mineral acids;

(2) aliphatic monocarboxylic acids; and (3) aromatic monocarboxylic acids; each of the acids of groups (1), (2) and (3) having a minimum ionization constant (K) of at least about $1.34 \times 10^{-5}$; and (4) polybasic acids having an ionization constant ($K_1$) in the range of from about $6.25 \times 10^{-2}$ to $9.75 \times 10^{-4}$, said acid being present in a concentration of at least about 3.5% as based upon the weight of the polyethyleneimine in said mixture.

2. A pressure sensitive adhesive composition displaying improved heat stability, said composition comprising a mixture, in aqueous solution, of polyvinyl alcohol from about 25.0 to 5.0 parts of polyethyleneimine per part by weight of said polyvinyl alcohol, and a polybasic acid having an ionization constant ($K_1$) in the range of from $6.25 \times 10^{-2}$ to $9.75 \times 10^{-4}$, said acid being present in a concentration of at least about 3.5% as based upon the weight of the polyethyleneimine in said mixture, said acid being selected from the group consisting of phosphoric, tartaric, citric, oxalic, fumaric and malonic acid.

3. A substrate coated with a water soluble, pressure sensitive adhesive composition displaying improved heat stability, said adhesive composition comprising the dried, consolidated residue of a mixture, in aqueous solution, of polyvinyl alcohol, from about 25.0 to 5.0 parts of polyethyleneimine per part by weight of said polyvinyl alcohol, and an acid selected from a group consisting of (1) monobasic mineral acids; (2) aliphatic monocarboxylic acids; and (3) aromatic monocarboxylic acids; each of the acids of groups (1), (2) and (3) having a minimum ionization constant (K) of at least about $1.34 \times 10^{-5}$; and (4) polybasic acids having an ionization constant ($K_1$) in the range of from about $6.25 \times 10^{-2}$ to $9.75 \times 10^{-4}$, said acid being present in a concentration of at least about 3.5% as based upon the weight of the polyethyleneimine in said mixture.

4. A substrate coated with a water soluble, pressure sensitive adhesive composition displaying improved heat stability, said adhesive composition comprising the dried, consolidated residue of a mixture, in aqueous solution, of polyvinyl alcohol, from about 25.0 to 5.0 parts of polyethyleneimine per part by weight of said polyvinyl alcohol, and a polybasic acid having an ionization constant ($K_1$) in the range of from about $6.25 \times 10^{-2}$ to $9.75 \times 10^{-4}$, said acid being present in a concentration of at least about 3.5% as based upon the weight of the polyethyleneimine in said mixture, said mixture being selected from the group consisting of phosphoric, tartaric, citric, oxalic, fumaric and malonic acids.

References Cited by the Examiner

UNITED STATES PATENTS

| | | | |
|---|---|---|---|
| 2,895,786 | 7/1959 | Schlack | 260—29.6 |
| 2,985,609 | 5/1961 | Plitt | 260—29.6 |
| 3,122,447 | 2/1964 | Sexsmith | 260—29.6 |

MURRAY TILLMAN, *Primary Examiner.*

N. F. OBLON, *Assistant Examiner.*